US012102857B2

(12) United States Patent
Wancho

(10) Patent No.: US 12,102,857 B2
(45) **Date of Patent: *Oct. 1, 2024**

(54) FIRE SUPPRESSION SPRINKLER AND DEFLECTOR

(71) Applicant: Victaulic Company, Easton, PA (US)

(72) Inventor: Thomas F. Wancho, Bethlehem, PA (US)

(73) Assignee: VICTAULIC COMPANY, Easton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/486,116

(22) Filed: Sep. 27, 2021

(65) Prior Publication Data

US 2022/0008772 A1 Jan. 13, 2022

Related U.S. Application Data

(62) Division of application No. 16/286,773, filed on Feb. 27, 2019, now Pat. No. 11,213,707.

(Continued)

(51) Int. Cl.

*B05B 1/26* (2006.01)
*A62C 31/00* (2006.01)

(Continued)

(52) U.S. Cl.

CPC ............ *A62C 37/14* (2013.01); *A62C 31/005* (2013.01); *A62C 37/08* (2013.01); *B05B 1/265* (2013.01); *A62C 3/002* (2013.01); *B05B 1/26* (2013.01)

(58) Field of Classification Search

CPC ....... A62C 3/002; A62C 31/005; A62C 31/02; A62C 37/08; A62C 37/10; A62C 37/11;

(Continued)

(56) References Cited

U.S. PATENT DOCUMENTS 2,135,138 A 11/1938 Kendall
2,949,241 A 8/1960 Simon (Continued)

FOREIGN PATENT DOCUMENTS

CA 2283155 9/1998
CA 2348144 11/2001

(Continued)

OTHER PUBLICATIONS

Author Unknown; Reliable—ESFR Pendent Sprinklers; www.reliablesprinkler.com; Bulletin 019 Jun. 2020; 5 pages.

(Continued)

*Primary Examiner* — Darren W Gorman
(74) *Attorney, Agent, or Firm* — Ballard Spahr LLP

(57) ABSTRACT

A sprinkler for a fire suppression system includes a deflector plate having five different types of slots extending from a periphery of the plate toward a center of the plate along radially extending lines. The slots are arrow shaped, club shaped and key hole shaped. Arrow head slots which align with frame arms supporting the deflector plate are wider than the thickness of the frame arms. Club shaped and arrow shaped slots proximate the plane of the frame arms are asymmetrical with respect to radial lines extending from the center of the plate, while arrow shaped and key hole shaped slots distal to the plane of the frame arms are symmetrical with respect to radial lines extending from the center of the plate.

47 Claims, 10 Drawing Sheets

Related U.S. Application Data

(60) Provisional application No. 62/640,208, filed on Mar. 8, 2018.

(51) Int. Cl.
*A62C 37/08* (2006.01)
*A62C 37/14* (2006.01)
*A62C 3/00* (2006.01)

(58) Field of Classification Search
CPC ......... A62C 37/12; A62C 37/14; A62C 37/16; B05B 1/26; B05B 1/265
See application file for complete search history.

(56) References Cited

U.S. PATENT DOCUMENTS

| | | | | |
|---|---|---|---|---|
| 4,099,675 | A | 7/1978 | Wohler et al. | |
| 5,366,022 | A | 11/1994 | Meyer et al. | |
| 5,579,846 | A | 12/1996 | Meyer et al. | |
| 5,584,344 | A | 12/1996 | Meyer et al. | |
| 5,609,211 | A | 3/1997 | Meyer et al. | |
| 5,628,367 | A | 5/1997 | Truax et al. | |
| 5,664,630 | A | 9/1997 | Meyer et al. | |
| 5,687,914 | A | 11/1997 | Bosio et al. | |
| 5,829,532 | A | 11/1998 | Meyer et al. | |
| 5,839,667 | A * | 11/1998 | Fishcer | A62C 31/02 169/37 |
| 5,865,256 | A | 2/1999 | Pounder | |
| 5,890,657 | A | 4/1999 | Ponte | |
| 6,026,907 | A | 2/2000 | Pahila | |
| 6,059,044 | A | 5/2000 | Fischer | |
| 6,098,718 | A | 8/2000 | Sato | |
| 6,276,460 | B1 | 8/2001 | Pahila | |
| 6,308,784 | B1 | 10/2001 | Mears | |
| 6,446,732 | B1 | 9/2002 | Polan | |
| 6,450,265 | B1 | 9/2002 | Ponte | |
| 6,450,266 | B1 | 9/2002 | Pahila | |
| 6,502,643 | B1 | 1/2003 | Meyer et al. | |
| 6,516,893 | B2 | 2/2003 | Pahila | |
| 6,868,917 | B2 | 3/2005 | Meyer et al. | |
| 6,976,543 | B1 | 12/2005 | Fischer | |
| 7,165,624 | B1 | 1/2007 | Fischer | |
| 7,201,234 | B2 | 4/2007 | Rogers et al. | |
| 7,314,093 | B2 | 1/2008 | Orr | |
| 7,343,980 | B2 | 3/2008 | Pahila | |
| 7,624,812 | B2 | 12/2009 | Pahila | |
| 7,658,231 | B2 | 2/2010 | Rogers et al. | |
| 7,730,959 | B2 | 6/2010 | Fischer | |
| 7,735,570 | B2 | 6/2010 | Fischer | |
| 7,766,091 | B2 | 8/2010 | Fischer | |
| 8,074,725 | B2 | 12/2011 | Rogers et al. | |
| 8,087,467 | B2 | 1/2012 | Franson et al. | |
| 8,172,001 | B2 | 5/2012 | Tow et al. | |
| 8,176,988 | B2 | 5/2012 | Fischer | |
| 8,186,448 | B2 | 5/2012 | Fischer | |
| 8,353,356 | B2 | 1/2013 | Rogers | |
| 8,353,357 | B2 | 1/2013 | Thompson | |
| 8,376,061 | B2 | 2/2013 | Feenstra | |
| 8,485,270 | B2 | 7/2013 | Fischer | |
| 8,646,539 | B2 | 2/2014 | Abels et al. | |
| 8,905,151 | B2 | 12/2014 | Silva, Jr. et al. | |
| 8,940,082 | B2 | 1/2015 | Eich et al. | |
| 9,089,729 | B2 | 7/2015 | Almeida et al. | |
| 9,132,305 | B2 | 9/2015 | Feenstra | |
| 9,457,213 | B2 | 10/2016 | Miller et al. | |
| 9,717,937 | B2 | 8/2017 | Miller et al. | |
| 9,827,455 | B1 | 11/2017 | Negrete | |
| 2007/0169945 | A1 | 7/2007 | Rogers et al. | |
| 2007/0246232 | A1 | 10/2007 | Pahila | |
| 2007/0256843 | A1 * | 11/2007 | Pahila | A62C 37/11 169/37 |
| 2008/0073088 | A1 | 3/2008 | Ide et al. | |
| 2009/0126950 | A1 | 5/2009 | Rogers | |
| 2010/0212919 | A1 | 8/2010 | Fischer | |
| 2010/0236795 | A1 | 9/2010 | Feenstra | |
| 2010/0276164 | A1 | 11/2010 | Feenstra | |
| 2011/0036598 | A1 | 2/2011 | Pahila | |
| 2012/0234562 | A1 | 9/2012 | Fischer | |
| 2012/0216498 | A1 | 10/2012 | Barnett et al. | |
| 2014/0174765 | A1 | 6/2014 | Miller et al. | |
| 2015/0122513 | A1 | 5/2015 | Miller et al. | |
| 2015/0246253 | A1 | 9/2015 | Miller et al. | |
| 2017/0151456 | A1 | 6/2017 | Abels et al. | |
| 2018/0071562 | A1 | 3/2018 | Wancho | |
| 2020/0282246 | A1 * | 9/2020 | Sato | A62C 31/02 |
| 2021/0094051 | A1 * | 4/2021 | Koiwa | B05B 1/265 |

FOREIGN PATENT DOCUMENTS

| | | | |
|---|---|---|---|
| CA | 2385352 | | 1/2002 |
| CA | 2384904 | | 12/2002 |
| CA | 2458421 | | 8/2005 |
| CA | 2827495 | | 6/2006 |
| CA | 2663777 | | 11/2007 |
| CA | 2695917 | | 2/2009 |
| CA | 2759321 | | 11/2010 |
| CA | 2885532 | | 3/2014 |
| CN | 102665825 | | 9/2012 |
| EP | 1264616 | | 12/2002 |
| EP | 3023127 | | 5/2016 |
| GB | 1351508 | | 5/1974 |
| JP | 2001046544 | | 2/2001 |
| KR | 2015070155 | | 6/2015 |
| RU | 2534978 | | 12/2014 |
| WO | 9306891 | | 4/1993 |
| WO | 9732670 | | 9/1997 |
| WO | 9839065 | | 9/1998 |
| WO | 0207824 | | 1/2002 |
| WO | 2006133057 | | 12/2006 |
| WO | 2007124403 | | 11/2007 |
| WO | 2008054863 | | 5/2008 |
| WO | 2009021067 | | 12/2009 |
| WO | 2010107451 | | 9/2010 |
| WO | 2010126547 | | 11/2010 |
| WO | 2013106244 | A2 | 7/2013 |
| WO | 2013159063 | | 10/2013 |
| WO | 2014047499 | | 3/2014 |

OTHER PUBLICATIONS

Author Unknown; Tyco—Model K-17-231—Upright and Pendent Sprinklers; www.tyco-fire.com; TFP332—Aug. 2018; 4 pages.

Author Unknown; Tyco—Model ESFR-25—25.2 K-factor Pendent Sprinkler; www.tyco-fire.com; TFP312—Mar. 2020; 6 pages.

Author Unknown; Victaulic—Firelock V47, K16.8; Model 4702 Early Suppression Fast Response; www.victaulic.com; 40.89—Victaulic Company 2019; 5 pages.

Author Unknown; Victaulic—LP-46 Low Pressure Storage Sprinkler; Model V4601, K25, Storage Pendent Sprinkler; www.victaulic.com; 40.95—Victaulic Company 2018; 9 pages.

* cited by examiner

FIRE SUPPRESSION SPRINKLER AND DEFLECTOR

CROSS REFERENCE TO RELATED APPLICATIONS

This application is a divisional of and claims benefit of priority to U.S. patent application Ser. No. 16/286,773, filed Feb. 27, 2019, which application is based upon and claims priority to U.S. Provisional Application No. 62/640,208, filed Mar. 8, 2018, both applications being hereby incorporated by reference herein.

FIELD OF THE INVENTION

This invention relates to fire suppression sprinklers and deflectors used with fire suppression sprinklers.

BACKGROUND

The growth of the warehousing storage market has created pressure to increase not only the square footage of warehouses, but also warehouse ceiling heights and the density with which products (known as commodities) may be stored in those warehouses. Sprinklers known as early suppression fast response (ESFR) fire suppression sprinklers were developed in the 1980s to face the fire challenges associated with warehouse storage. Sets of interrelated codes and standards, especially those promulgated by the National Fire Sprinkler Association (NFPA), UL, and FM Global set the standards for the minimum performance of ESFR sprinklers as well as for the applications in which the different ESFR sprinklers may be used depending on their individual performance. Such ESFR sprinklers are commonly classified by the amount of water they are capable of delivering at a given pressure, expressed as a "k-factor" which is defined as the relationship between the water discharge rate "Q" from a sprinkler to the water pressure "p" with in the sprinkler through the formula $Q=k(p)^{1/2}$, with ESFR sprinklers having standardized k-factors of approximately 14, 17, and 25 being exemplars. Higher k-factor sprinklers discharge more water at a given pressure than do smaller k-factors, therefore, higher k-factor ESFR sprinklers are used to provide protection as ceiling heights increase, and standards such as NFPA-13 "Standard for the Installation of Sprinkler Systems" set forth certain maximum ceiling heights, commodity heights, and commodity spacing for use with given k-factor sprinklers.

A recent challenge to the design of ESFR sprinklers of k-factor 17 and greater (which are capable of being listed for use with ceiling heights of 40' and greater) was a change to the performance criteria set forth by UL's UL1767 standard that such sprinklers demonstrate the ability to meet the demands of what is known as "high clearance" applications via a live fire test. High clearance applications refer to the protection of commodities in warehouses having a large clearance between the warehouse ceiling and the commodity. Warehouses having a ceiling height of 40 feet and greater may have commodities shelved in racks at a height of 20 feet from the floor, leaving a clearance of twenty feet between the ceiling (near where the sprinklers are positioned) and the commodity. Where the clearance distance is greater than 10 feet, such applications are referred to as "high clearance" applications. The challenges to ESFR sprinklers operating at such high clearances include maintaining a core flow of fire suppressing liquid which has sufficient density and velocity to suppress a fire below the sprinkler itself while also maintaining an outer surrounding "umbrella" spray pattern to provide the required disbursement to protect the desired area, as well as sufficient flow in an intermediate range between the outer umbrella pattern and the core flow to prevent a fire in that intermediate zone from growing and overwhelming the outer umbrella. However, for some prior art ESFR sprinkler designs, a high clearance distance between the sprinkler and the commodity allows the spray pattern to become disbursed over too large an area, thereby reducing the spray pattern density, especially in the intermediate zone, and hence the sprinkler's fire suppression effectiveness. Such conditions may also allow updrafts created by the fire plume to disrupt and lift the outer umbrella spray pattern, which in some cases causes wetting and cooling of adjacent sprinklers, thereby preventing or delaying their operation. This phenomenon is known as "skipping" because the fire's heat plume "skips" the nearby cooled sprinklers which are otherwise best placed to suppress the fire. Furthermore, skipping also tends to permit the triggering of sprinklers that are more remote from the fire, and thus less effective at fire suppression. The result is an increase in both fire and water damage as well as additional risk to firefighters called to fight the blaze, as skipping may ultimately result in the fire protection system being overwhelmed.

In addition to the regulations which control the ceiling height and the height of the commodity shelved in racks below the ceiling at each given sprinkler k-factor, these regulations further set forth certain minimum clearance distances between the racks which store the commodity (known as the aisle width). These regulations exist because the demands on a system of ESFR sprinklers is affected not only by the maximum height at which a commodity is stored, but also by the number of racks of the commodity stored below any given grid of ESFR sprinklers. The minimum aisle width standards thus act in concert with the rack height standards as a limit on the amount of commodity which can be stored in a given area, while requiring clearance between the racks for the water plume from the sprinklers to travel unimpeded by the racks to reach the source of the fire as well as to wet adjacent racks of commodity to prevent ignition jumping from one rack to another. Smaller minimum aisle widths thus represent increasing demands on the performance of ESFR sprinklers as well as offering increased density of commodity storage at any given maximum storage height. Conversely, ESFR sprinklers which can exceed the minimum testing criteria necessary to achieve approvals for use at standard aisle widths, and which are approved for use at aisle widths less than the standard minimum aisle widths (known as Specific Application approvals) can be seen as having demonstrated improved performance which can improve fire suppression even at standard aisle widths.

The design of high k-factor ESFR sprinklers is therefore challenged not only by the need to pass the minimum performance criteria for such sprinklers, such that the sprinkler may be marketed as listed or approved for the default applications, but also by the desire to have performance that exceeds those minimum criteria in order to obtain Special Application approvals for use in a greater range of applications, especially those which permit a greater density storage of the commodity at smaller aisle widths than the minimum performance criteria in NFPA 13 allows. Such high performance ESFR sprinklers may be expected to provide improved protection even at standard storage densities and aisle widths.

There is clearly an opportunity to improve fire suppression sprinklers, particularly ESFR type sprinklers, to handle the challenges of high clearance warehouse fire protection and offer improved performance, including through demonstrating an ability to tolerate an increase the density at which commodities may be stored.

SUMMARY

The invention concerns a fire suppression sprinkler. In an example embodiment the sprinkler comprises a body surrounding a bore. The bore defines a flow axis arranged coaxially with the bore. First and second frame arms are mounted on opposite sides of the body and extend therefrom in a direction along the flow axis. The frame arms define a plane. A nose is mounted on the ends of the frame arms. The nose is positioned coaxially with the flow axis. A deflector plate is mounted on the nose and oriented transversely to the flow axis. The deflector plate has a periphery surrounding a center located on the flow axis. The deflector plate comprises two slots of a first configuration extending from the periphery radially toward the center. The two of the slots of the first configuration are disposed in the plane. Four slots of a second configuration extend from the periphery radially toward the center and are located about the periphery such that one of the slots of the second configuration is positioned adjacent to each side of each of the slots of the first configuration. Four slots of a third configuration extend from the periphery radially toward the center and are located about the periphery such that one of the slots of the third configuration is positioned adjacent to one of the slots of the second configuration. The slots of the second configuration have a greater area than the slots of the first and the third configurations.

An example embodiment further comprises four slots of a fourth configuration extending from the periphery radially toward the center. These slots are located about the periphery such that one of the slots of the fourth configuration is positioned adjacent to one of the slots of the third configuration. The slots of the fourth configuration have a greater area than the slots of the third configuration.

In an example embodiment the bore defines a k factor of k=14.0 or greater. The fire suppression sprinkler is adapted to be installed in a pendent orientation by way of example.

In a particular example embodiment the slots of the second configuration have a club shape comprising a handle extending from the periphery and a club head terminating at a distance from the center, wherein a width of the club head proximate to the handle is less than a width of the club head proximate to the center. In an example embodiment a widest width of the club head is wider than a widest width of the handle. Further by way of example, the club head has a curved tip at the distance from the center. In a specific example, the club head is asymmetric with respect to a line extending radially from the center for the slots of the second configuration. In an example embodiment, the club head is defined by a first edge oriented at a first angle with respect to the line, and a second edge, opposite to the first edge, the second edge oriented at a second angle with respect to the line, the second angle being different from the first angle.

Further by way of example, each of the slots of the second configuration are symmetric with respect to a line extending radially from the center. Additionally by way of example, the slots of the fourth configuration have a keyhole shape comprising a waist extending from the periphery and a key head terminating at a distance from the center. In an example embodiment, a widest width of the key head is wider than a widest width of the waist. By way of example, a width of the key head proximate to the waist is equal to a width of the key head proximate to the center. In a further example, the key head has a curved tip at the distance from the center. In another example embodiment, the key head is symmetric with respect to a line extending radially from the center.

In an example embodiment, the slots of the first configuration have an arrowhead shape comprising a shaft extending from the periphery and an arrowhead terminating at a first distance from the center. By way of example, the arrowhead is asymmetric with respect to a line extending radially from the center. In another example embodiment, the arrowhead is defined by a first edge oriented at a first angle with respect to the line, and a second edge, opposite to the first edge, the second edge oriented at a second angle with respect to the line, the second angle being different from the first angle. Further by way of example, a widest width of the arrowhead is wider than a widest width of the shaft. In a specific example, a width of the arrowhead proximate to the shaft is greater than a width of the arrowhead proximate to the center. In a further example, the arrowhead has a curved tip at the distance from the center. Also by way of example, the shaft has a width at the periphery which is greater than a width of the shaft proximate to the arrowhead. In an example embodiment, the shaft is defined by first and second oppositely disposed edges. The edge are angularly oriented with respect to a line extending radially from the center such that the shaft has a width at the periphery which is greater than a width of the shaft proximate to the arrowhead The invention encompasses a fire suppression sprinkler, which, in an example embodiment comprises a body surrounding a bore. The bore defines a flow axis arranged coaxially with the bore. First and second frame arms are mounted on opposite sides of the body and extend therefrom in a direction along the flow axis. The frame arms define a plane. A nose is mounted on the ends of the frame arms. The nose is positioned coaxially with the flow axis. A deflector plate is mounted on the nose and oriented transversely to the flow axis. The deflector plate has a periphery surrounding a center located on the flow axis. The deflector plate comprises a plurality of slots of a first configuration extending from the periphery radially toward the center and terminating at a first distance from the center. At least two of the slots of the first configuration are disposed in the plane. At least four slots of a second configuration extends from the periphery radially toward the center and terminate at a second distance from the center. The slots of the second configuration being located about the periphery such that one of the slots of the second configuration is positioned adjacent to each side of each of the slots of the first configuration which are disposed in the plane. A plurality of slots of a third configuration extend from the periphery radially toward the center and terminate at a third distance from the center. The second distance is less than any of the first or third distances in this example.

In an example embodiment the nose has a maximum radius measured from the flow axis. The first, second, and third distances are greater than the maximum radius.

In an example embodiment, the bore defines a k factor of k=14.0 or greater and the fire suppression sprinkler is adapted to be installed in a pendent orientation.

By way of example, the slots of the second configuration have a club shape comprising a handle extending from the periphery and a club head terminating at a distance from the center. A width of the club head proximate to the handle is less than a width of the club head proximate to the center in this example. Further by way of example, a widest width of the club head is wider than a widest width of the handle. Also by way of example, the club head has a curved tip at the distance from the center. In an example embodiment, the club head is asymmetric with respect to a line extending radially from the center. By way of example, the club head is defined by a first edge oriented at a first angle with respect to the line, and a second edge, opposite to the first edge. The second edge is oriented at a second angle with respect to the line, the second angle being different from the first angle.

In an example embodiment each of the slots of the second configuration are symmetric with respect to a line extending radially from the center. Further by way of example, the slots of the third configuration have a keyhole shape comprising a waist extending from the periphery and a key head terminating at a distance from the center. In an example embodiment, a widest width of the key head is wider than a widest width of the waist. Further by way of example, a width of the key head proximate to the waist is equal to a width of the key head proximate to the center. In a particular example, the key head has a curved tip at the distance from the center. By way of example, the key head is symmetric with respect to a line extending radially from the center.

In an example embodiment, the slots of the first configuration have an arrowhead shape comprising a shaft extending from the periphery and an arrowhead terminating at a first distance from the center. The arrowhead may be asymmetric with respect to a line extending radially from the center in an example embodiment. By way of example the arrowhead is defined by a first edge oriented at a first angle with respect to the line, and a second edge, opposite to the first edge, the second edge oriented at a second angle with respect to the line, the second angle being different from the first angle. In an example embodiment, a widest width of the arrowhead is wider than a widest width of the shaft. In a further example, a width of the arrowhead proximate to the shaft is greater than a width of the arrowhead proximate to the center. In a particular example, the arrowhead has a curved tip at the distance from the center. Further by way of example, the shaft has a width at the periphery which is greater than a width of the shaft proximate to the arrowhead. In an example embodiment, the shaft is defined by first and second oppositely disposed edges. The edges are angularly oriented with respect to a line extending radially from the center such that the shaft has a width at the periphery which is greater than a width of the shaft proximate to the arrowhead.

The invention further encompasses an early suppression fast response fire suppression sprinkler, which, by way of example, comprises a body adapted for use in a pendent orientation. The body surrounds a bore. The bore defines a flow axis arranged coaxially with the bore. The bore further defines a k factor of k=25.2 or greater in this example. First and second frame arms are mounted on opposite sides of the body and extend therefrom in a direction along the flow axis. The frame arms define a plane. A plug is removably mounted on the body between the frame arms and overlying the bore. A nose is mounted on ends of the frame arms at a distance from the plug less than 1.0 inches in this example. The nose is positioned coaxially with the flow axis. A deflector plate is mounted on the nose and is oriented transversely to the flow axis. The deflector plate has a periphery surrounding a center located on the flow axis. In this example the deflector plate comprises a plurality of first slots extending from the periphery radially toward the center and terminating at a first distance from the flow axis. A least two of the first slots are disposed in the plane in this example. A plurality of second slots extend from the periphery radially toward the center and terminate at a second distance from the flow axis. The second slots are located about the periphery such that one of the second slots is positioned adjacent to each side of each of the first slots which are disposed in the plane. In this example the second distance is less than the first distance. Further by way of example, the nose has a maximum radius measured from the flow axis. The first and second distances bareeing greater than the maximum radius.

DETAILED DESCRIPTION

Figure 1:
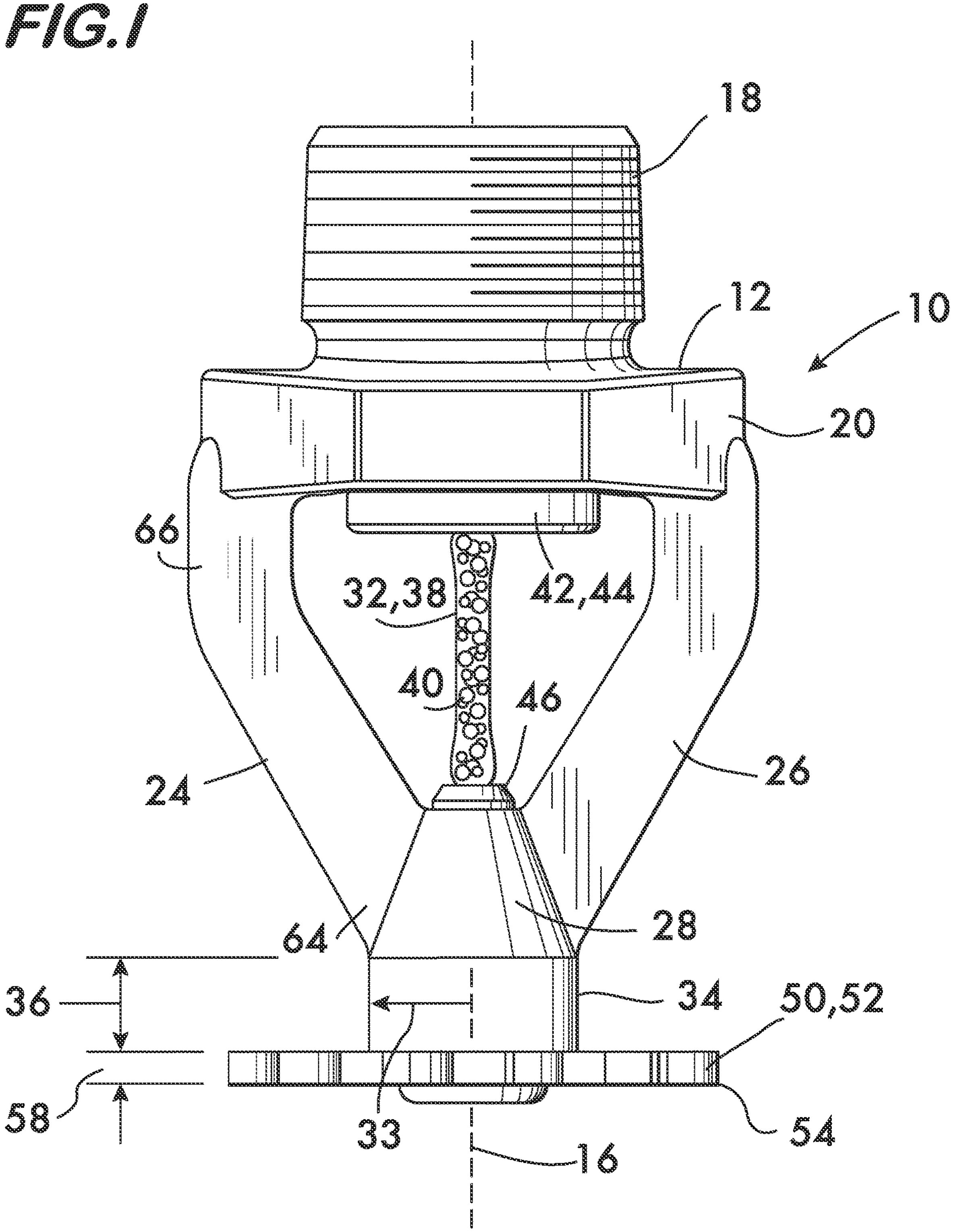
FIG. 1 is a side view of an example fire suppression sprinkler according to the invention.
Figure 2:
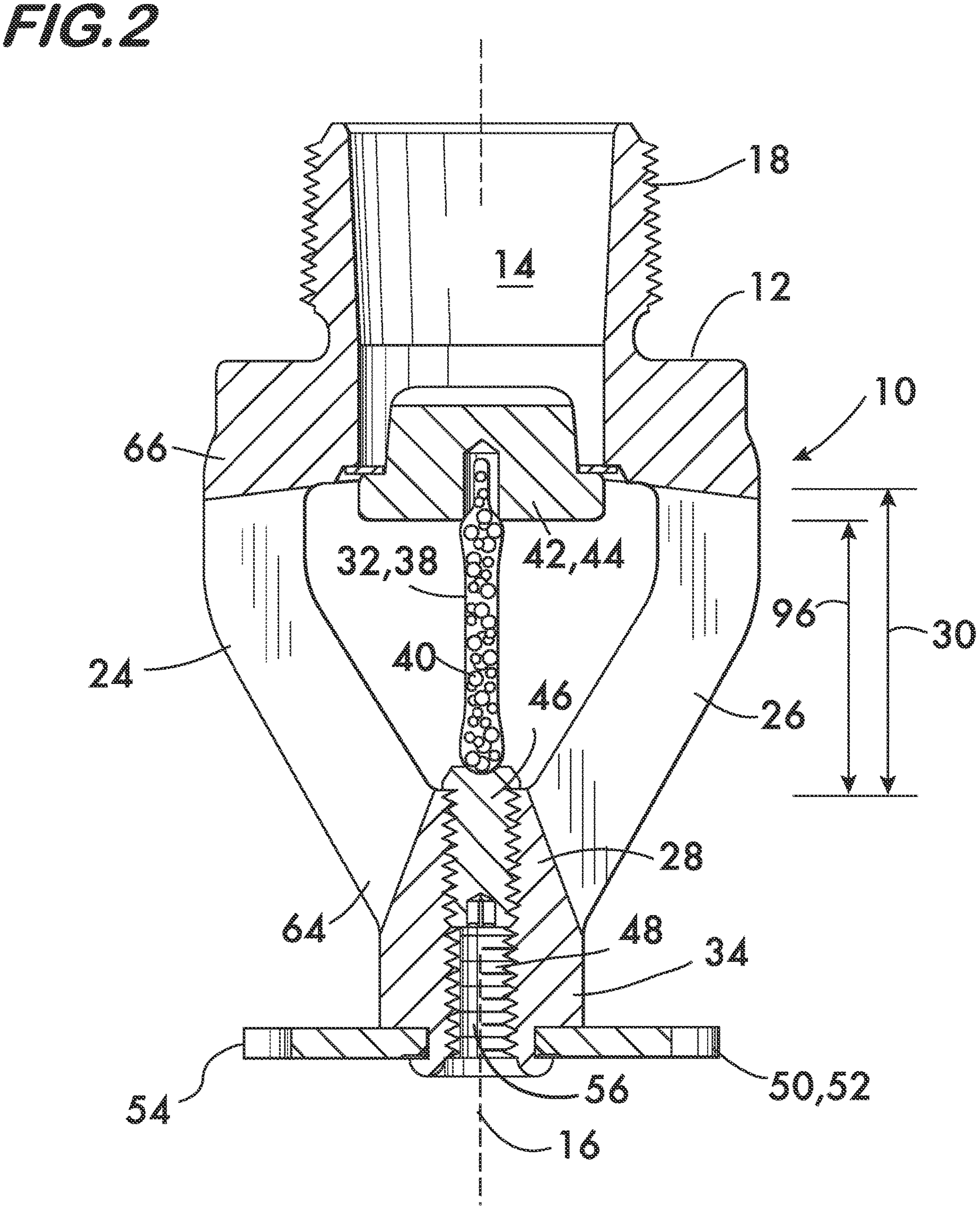
FIG. 2 is a partial longitudinal sectional view of the fire suppression sprinkler shown in FIG. 1.

FIGS. 1 and 2 show an example fire suppression sprinkler 10 according to the invention. Sprinkler 10 may be, for example, an early suppression fast response (ESFR) sprinkler having a "k factor" from about 17 to about 34, and specifically 25.2.

Figure 1A:
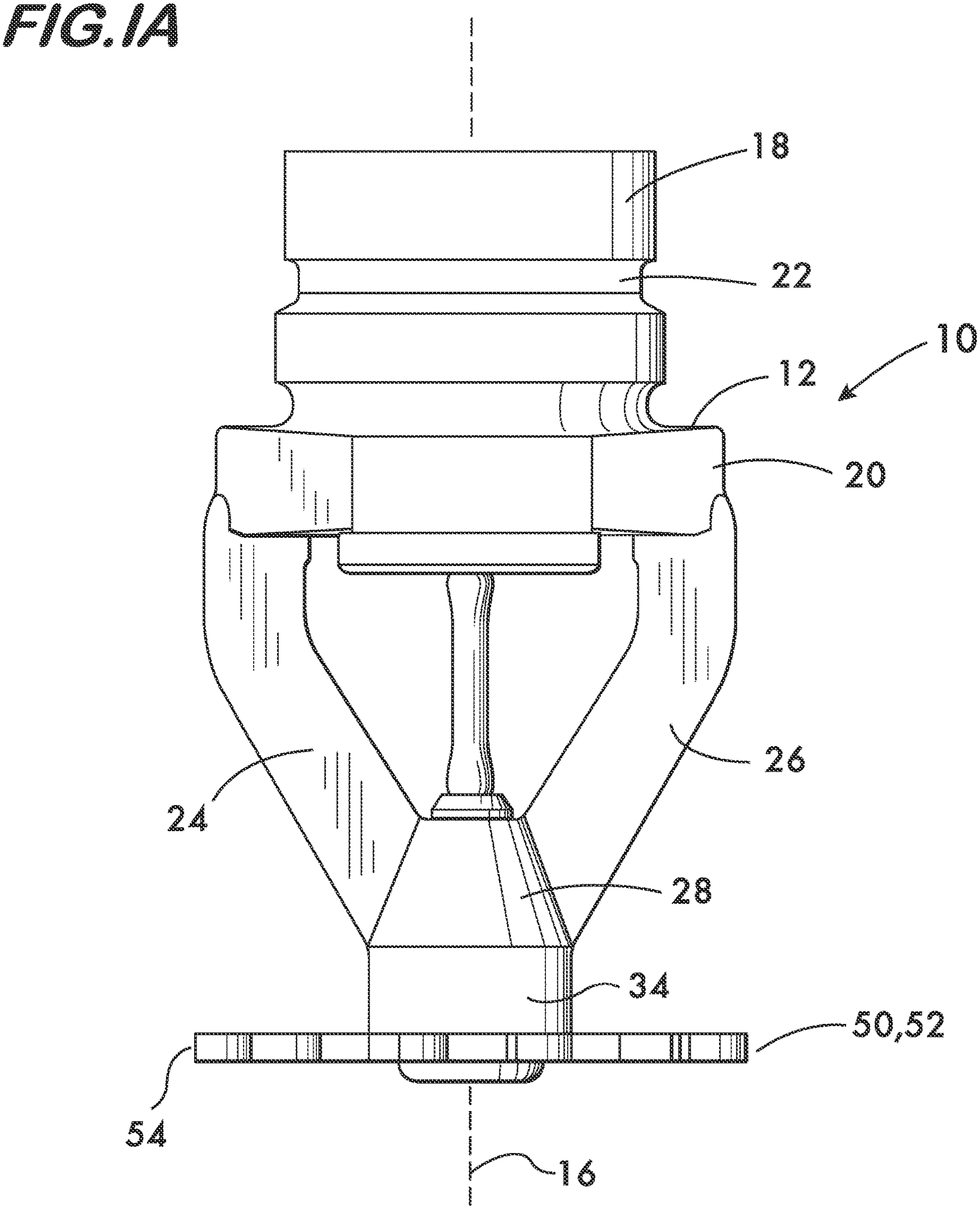
FIG. 1A is a side view of an example fire suppression sprinkler according to the invention.

As shown in FIG. 2, sprinkler 10 comprises a body 12 which surrounds a bore 14. Bore 14 defines a flow axis 16 arranged coaxially with the bore. Body 10 has a nipple 18 for connection of the sprinkler 10 to a piping network of a fire suppression system (not shown) and a plurality of flat surfaces 20 (see FIG. 1) which receive a wrench for applying torque to the sprinkler during installation. Nipple 18 may be threaded as shown in FIGS. 1 and 2, or, as shown in FIG. 1A, nipple 18 may have a groove 22 to enable the use of a mechanical coupling to connect the sprinkler to the piping network of a fire suppression system. First and second frame arms 24 and 26 extend from opposite sides of body 12 parallel to flow axis 16 and support a nose 28 mounted on the ends of the arms. Arms 24 and 26 extend along flow axis 16 by a length 30 as measured from the end of the bore 14 to the base of the nose 28 (see FIG. 2). Nose 28 is positioned coaxially with the flow axis 16 and supports a heat sensitive trigger 32. Nose 28 in this example is conical and has a maximum radius 33 (measured from flow axis 16) which transitions into a flow conditioning portion 34. Flow conditioning portion 16 is advantageously cylindrical, and extends beyond the ends of arms 24 and 26 a length 36 (see FIG. 1), thereby permitting a deflector to be mounted on nose 28 in spaced relation to the ends of arms 24 and 26.

In this example the heat sensitive trigger 32 comprises a frangible glass bulb 38 containing a heat sensitive liquid 40. Bulb 38 extends between nose 28 and a sealing member 42, in this example a plug 44 which overlies and seals the bore 14 through engagement with body 12. As shown in FIG. 2, nose 28 also comprises a set screw 46, threaded within a bore 48 in nose 28 aligned with the bulb 38. The set screw 46 permits assembly of the bulb 38 into the sprinkler 10 and adjustment of the compression force on the bulb. Bulb 38 supports the plug 44 to maintain the sprinkler 10 in its closed configuration (shown). Bulb 38 breaks when the ambient temperature reaches a predetermined value, for example, indicative of a fire. In various embodiments, such predetermined temperature values may be approximately 155° F. or 200° F. When the bulb 38 breaks it no longer supports plug 44 which is then released from engagement with the body 12 to open sprinkler 10 and allow water or other fire suppressing fluid to be discharged. Other heat sensitive triggers are also feasible, such as those having components held together by a solder which melts at a predetermined temperature to allow the sprinkler to open.

Figure 3:
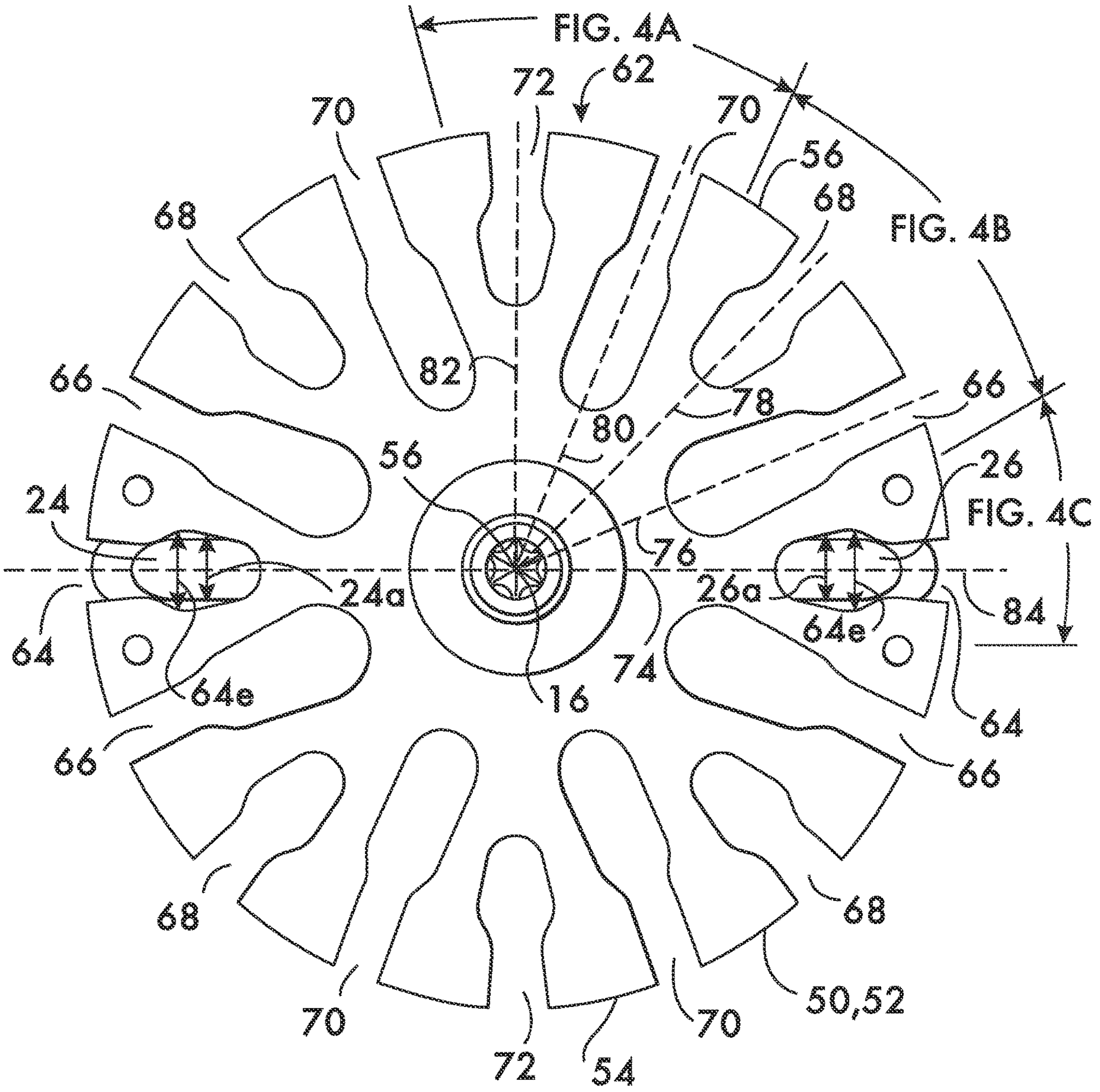
FIG. 3 is an end view of the fire suppression sprinkler shown in FIG. 1 and showing a plan view of an example deflector according to the invention.

A deflector 50 is mounted on the nose 28. As shown in FIGS. 2 and 3, the example deflector 50 comprises plate 52, advantageously circular and in a plane oriented transversely to the flow axis 16. Plate 52 has a periphery 54 surrounding a center 56, the center being coincident with the flow axis 16. Plate 52 has a thickness 58 (see FIG. 1). The deflector 50 is positioned in spaced relation to the ends of arms 24 and 26 at the distance 36. In an example embodiment, the distance 36 is greater than twice the thickness 58 of plate 52. In another example embodiment, the distance 36 is approximately three times the thickness 58 of the plate 52.

Figure 4:
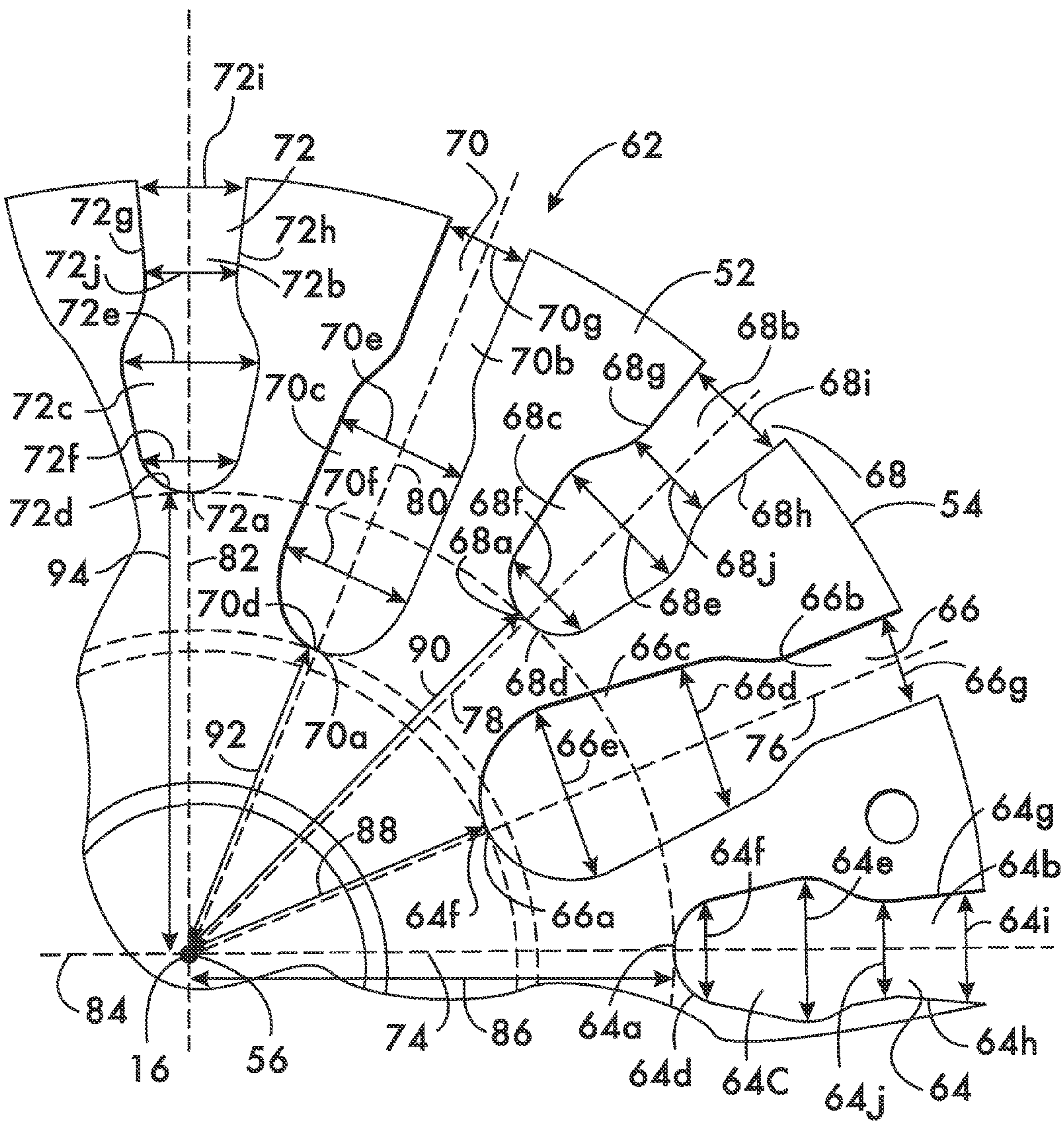
FIG. 4 is a plan view of a quadrant of the example deflector shown in FIG. 3.

As shown in FIGS. 3 and 4, plate 52 defines a plurality of slots 62. Slots 62 are designed in conjunction with nose 28, arms 24 and 26 (including the length 30), flow conditioning region 34 (including length 36), and bore 14 to meet standards governing discharge rate, coverage area size and shape, and other performance standards in order to permit installation under NFPA 13, including passage of the testing set forth in standards promulgated by FM Global and UL, such standards including UL 1767 and FM 2008.

The example sprinkler 10 is further designed to achieve higher performance, including enabling the higher density storage of commodities by being qualified under UL 1767 (and permitted under NFPA 13) to be installed in specific applications where the ceiling height is a maximum of 48 feet, the commodity height is a maximum of 43 feet and where the aisle spacing is a minimum of 4 feet.

To this end, slots 62 comprise slots of five configurations, slots 64, slots 66, slots 68, slots 70, and slots 72, respectively, all of which extend radially from the periphery 54 of the plate 52 toward the plate center 56, each slot extending along a respective line 74, 76, 78, 80 and 82 which extend radially from the plate center 56.

Figure 4A:
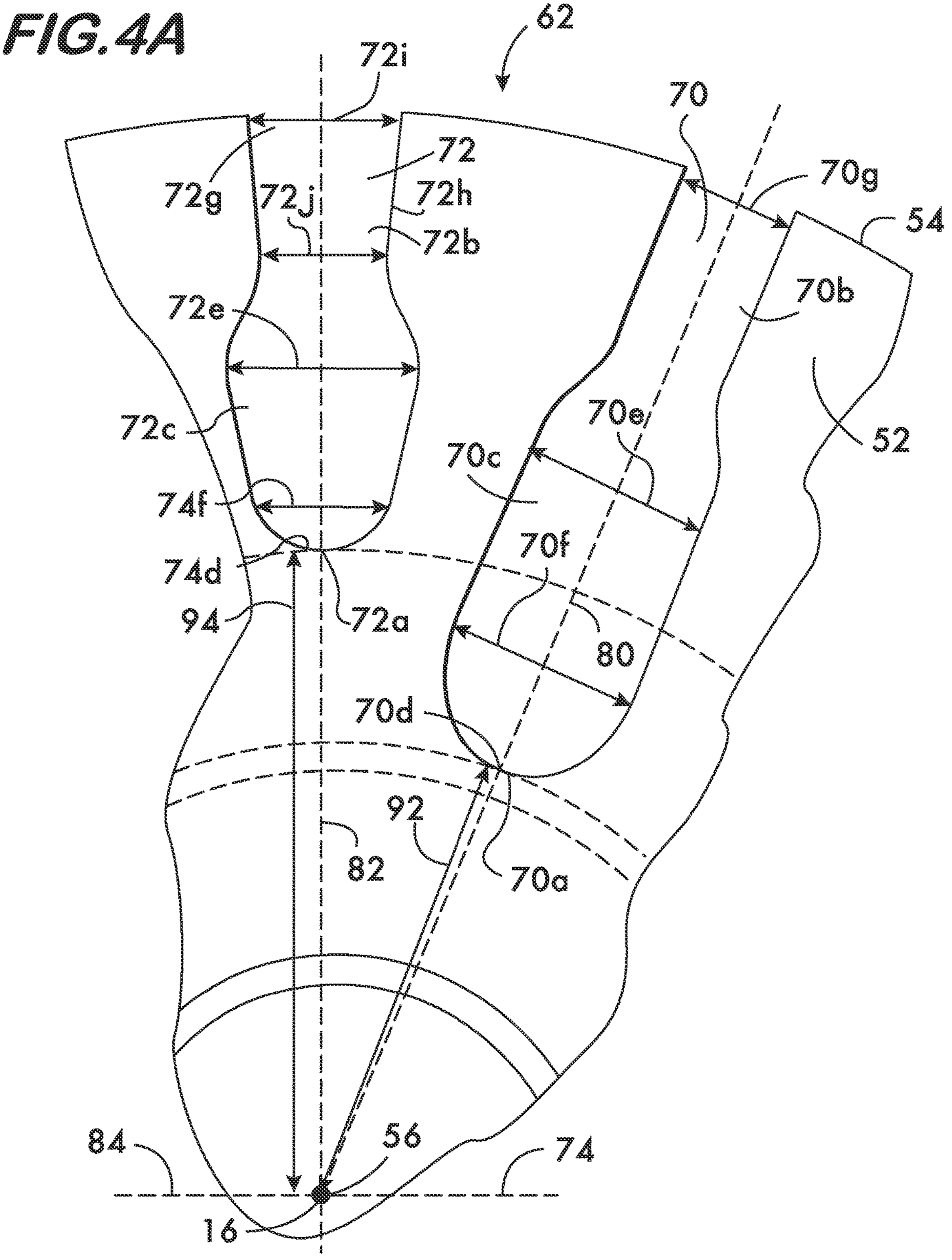
FIGS. 4*a*, 4B and 4C are plan views of sectors of the deflector, on an enlarged scale, as respectively denoted by arc lengths 4A, 4B and 4C in FIG. 3.

As is apparent from FIG. 3, slots 64 are aligned with the first and second arms 24 and 26 which are disposed in a plane 84. As shown in FIGS. 4 and 4C, slots 64 extend from the periphery 54 of the plate 52 and terminate at points 64*a* which lie at a distance 86 from the plate center 56. Slots 64 are of generally arrow shape, arrow shape meaning that slots 64 have a shaft 64*b* extending from the periphery 56 and an arrowhead 64*c* terminating in a curved tip 64*d* at point 64*a*. Slots 64 in this example are symmetric about line 74 and the arrowhead 64*c* has a width 64*e* proximate to the shaft 64*b* which is greater than its width 64*f* proximate the plate center 56. As shown in FIG. 3, width 64*e* may be advantageously equal to or greater than the thicknesses 24*a* and 26*a* of the arms 24 and 26 respectively. With reference again to FIGS. 4 and 4C, width 64*e*, the widest width of the arrowhead 64*c* is also wider than the widest width of the shaft 64*b* in this example.

Advantageously, the shaft 64*b* is defined by first and second oppositely disposed edges 64*g* and 64*h* which are angularly oriented with respect to line 74 such that shaft 64*b* has a width 64*i* at the plate periphery 54 which is greater that a width 64*j* of the shaft 64*b* proximate to the arrowhead 64*c*.

Figure 4B:
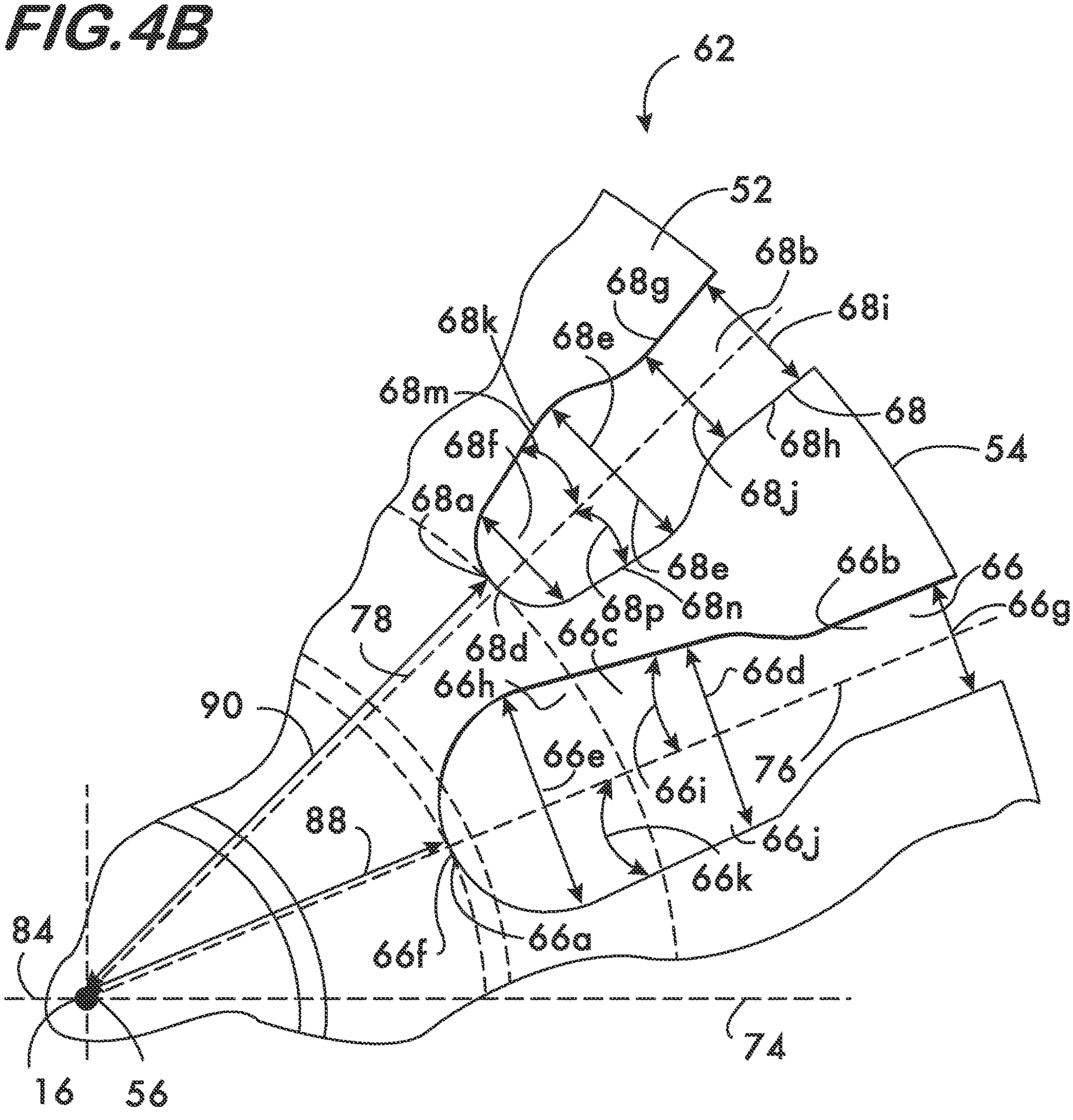
Figure 4C:
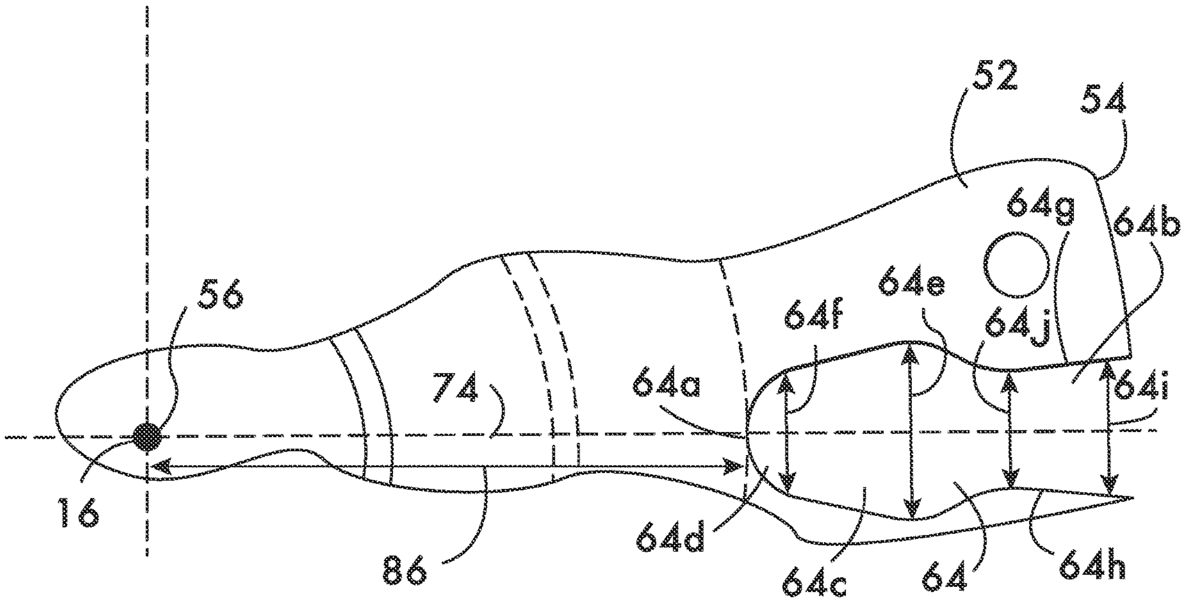

As shown in FIGS. 3, 4 and 4B, slots 66 are adjacent each side of the two slots 64, and extend from the periphery 54 of plate 52 to terminate at points 66*a* which lie at a distance 88 from the plate center 56. Slots 66 are generally club shaped, club shape meaning that slots 66 comprise a handle 66*b* extending from the periphery 54 and a club head 66*c* terminating at point 66*a*. The width 66*d* of the club head 66*c* proximate to handle 66*b* is less than the width 66*e* of the club head proximate to the plate center 56. Club head 66*c* terminates at point 66*a* in a curved tip 66*f*. The widest width 66*e* of the club head is wider than the widest width 66*g* of the handle 66*b*.

As shown in FIG. 4B, slots 66 are preferably asymmetric about lines 76. Club head 66*c* is defined by a first edge 66*h* oriented at a first angle 66*i* with respect to line 76, and a second edge 66*j* oriented at a second angle 66*k* with respect to line 76. Angle 66*i* is different from angle 66*k* to produce the asymmetry of slots 66. Slots 66 advantageously have the largest surface area of any of slots 64, 68, 70 and 72.

As shown in FIGS. 3, 4 and 4B, slots 68 extend from the periphery 54 of the plate 52 and terminate at points 68*a* which lie at a distance 90 from the plate center 56. Slots 68 are of generally arrow shape, arrow shape meaning that slots 68 have a shaft 68*b* extending from the periphery 56 and an arrowhead 68*c* terminating in a curved tip 68*d* at point 68*a*. The arrowhead 68*c* has a width 68*e* proximate to the shaft 68*b* which is greater than its width 68*f* proximate the plate center 56. Width 68*e*, the widest width of the arrowhead 68*c* is also wider than the widest width of the shaft 68*b* in this example.

Advantageously, the shaft 68*b* is defined by first and second oppositely disposed edges 68*g* and 68*h* which are angularly oriented with respect to line 78 such that shaft 68*b* has a width 68*i* at the plate periphery 54 which is greater that a width 68*j* of the shaft 68*b* proximate to the arrowhead 68*c*.

As shown in 4B, slots 68 in this example are asymmetric about line 78. Arrowhead 68*c* is defined by a first edge 68*k* oriented at a first angle 68*m* with respect to line 78, and a second edge 68*n* oriented at a second angle 68*p* with respect to line 78. Angle 68*m* is different from angle 68*p* to produce the asymmetry of slots 68.

As shown in FIGS. 3, 4 and 4A, slots 70 lie between slots 68 and 72 and extend along line 80 from the plate periphery 54 to terminate at a point 70*a* at a distance 92 from the plate center 56. Slots 70 are generally elongate keyhole shaped, elongate keyhole shaped meaning that slots 70 comprise a waist 70*b* extending from periphery 54 and a key head 70*c* terminating at point 70*a* in a curved tip 70*d*. Slots 70 are symmetric about lines 80 in this example. The width 70*e* of the key head 70*c* proximate the waist 70*b* is equal to the width 70*f* of the key head proximate the plate center 56. The widest width 70*e* or 70*f* is wider than the widest width 70*g* of the waist 70*b*.

Figure 3A:
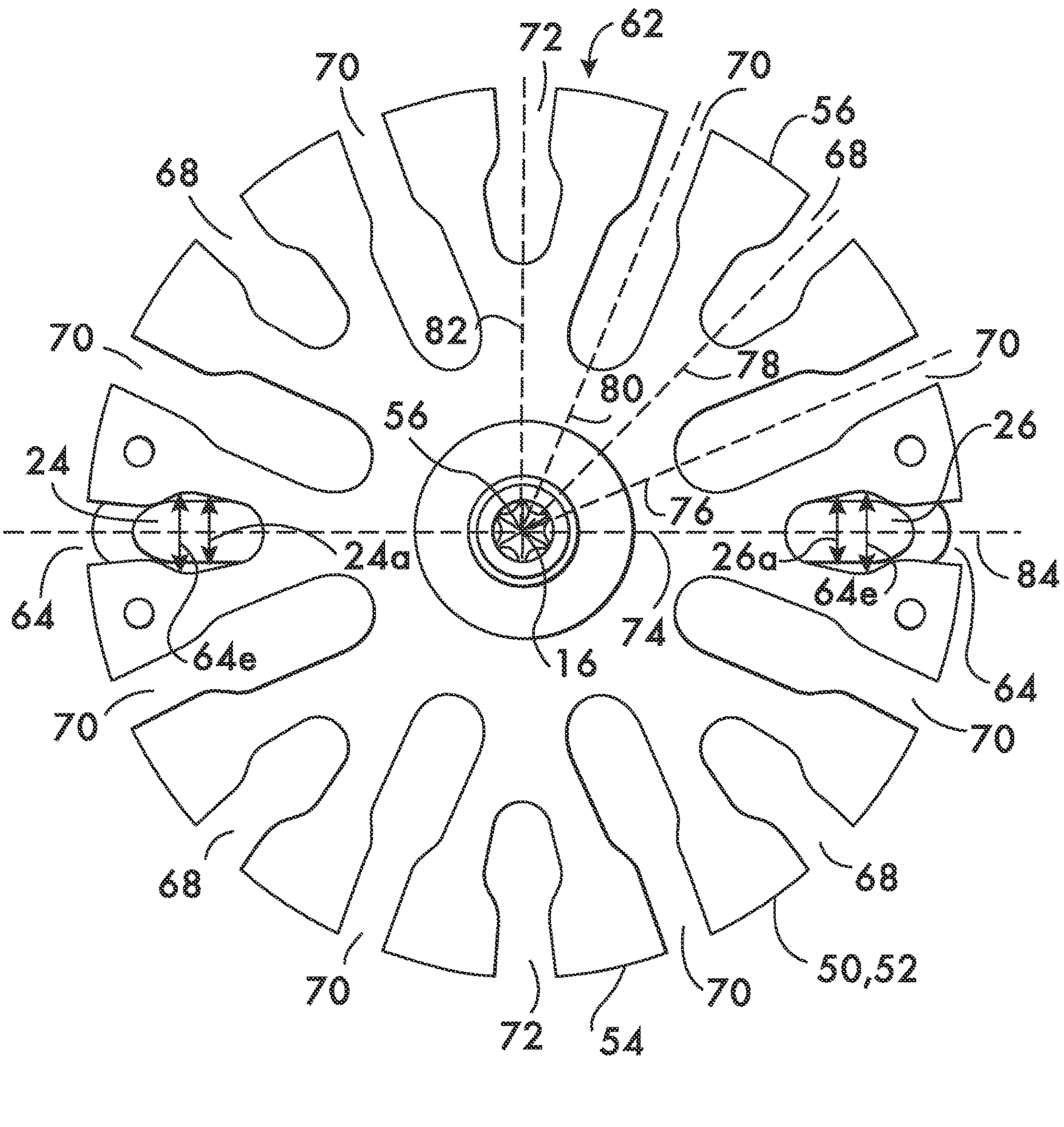
FIG. 3A is an end view of another embodiment of the fire suppression sprinkler according to the invention showing a plan view of an example deflector.

FIG. 3A shows another embodiment wherein slots 70, having the keyhole shape, are positioned adjacent each side of the two slots 64, and extend from the periphery 54 of plate 52, effectively replacing slots 66.

As shown in FIGS. 3, 4 and 4A, slots 72 extend from the periphery 54 of the plate 52 and terminate at points 72*a* which lie at a distance 94 from the plate center 56. Slots 72 are of generally arrow shape, arrow shape meaning that slots 72 have a shaft 72*b* extending from the periphery 56 and an arrowhead 72*c* terminating in a curved tip 72*d* at point 72*a*. Slots 72 in this example are symmetric about lines 82 and the arrowhead 72*c* has a width 72*e* proximate to the shaft 72*b* which is greater than its width 72*f* proximate the plate center 56. Width 72*e*, the widest width of the arrowhead 72*c* is also wider than the widest width of the shaft 72*b* in this example.

Advantageously, the shaft 72*b* is defined by first and second oppositely disposed edges 72*g* and 72*h* which are angularly oriented with respect to line 82 such that shaft 72*b* has a width 72*i* at the plate periphery 54 which is greater that a width 72*j* of the shaft 72*b* proximate to the arrowhead 72*c*. It is also advantageous when width 72*i* is greater than the width 64*i* of the shaft 64*b* at the periphery. It is also advantageous for line 82 to be oriented at 90° to line 74, resulting in slot 72 being oriented at 90° to slot 64. Additionally, with respect to the distances 86, 88, 90, 92 and 94, it is advantageous if distance 88 is less than distances 86, 90, 92 and 94. It is further advantageous if the distance 92 is less than distances 86, 90 and 94. Moreover, it is advantageous if distances 86, 90 and 94 are equal to one another.

The example arrangement of the slots 62 shown in FIG. 3 is expected to be advantageous. In this arrangement there are five different types of slots 62. Slots 64 may be regarded as a pair of first slots (first configuration) positioned in plate 52 at 180° from one another. Slots 72 may be considered a pair of second slots (second configuration) positioned in plate 52 at 90° and 270° from either one of the first slots 64. Slots 66 may be considered as third slots (third configuration). In the example arrangement, there are four of the third configuration slots 66 positioned in plate 52 at 22.5°, 157.5°, 202.5° and 337.5° from one of the first slots 64. Slots 68 may be considered to be fourth slots (fourth configuration). In the example arrangement there are four fourth configuration slots positioned in plate 52 respectively at 45°, 135°, 225° and 315° from one of the first slots 64. Slots 70 may be considered to be fifth slots (configuration type). In the example arrangement there are four fifth configuration slots positioned in plate 52 respectively at 67.5°, 112.5°, 247.5° and 292.5° from one of the first slots 64. It is understood that the angular separation of the slots are exemplary nominal angles subject to manufacturing tolerances and thus may vary from those as specified herein.

Figure 1B:
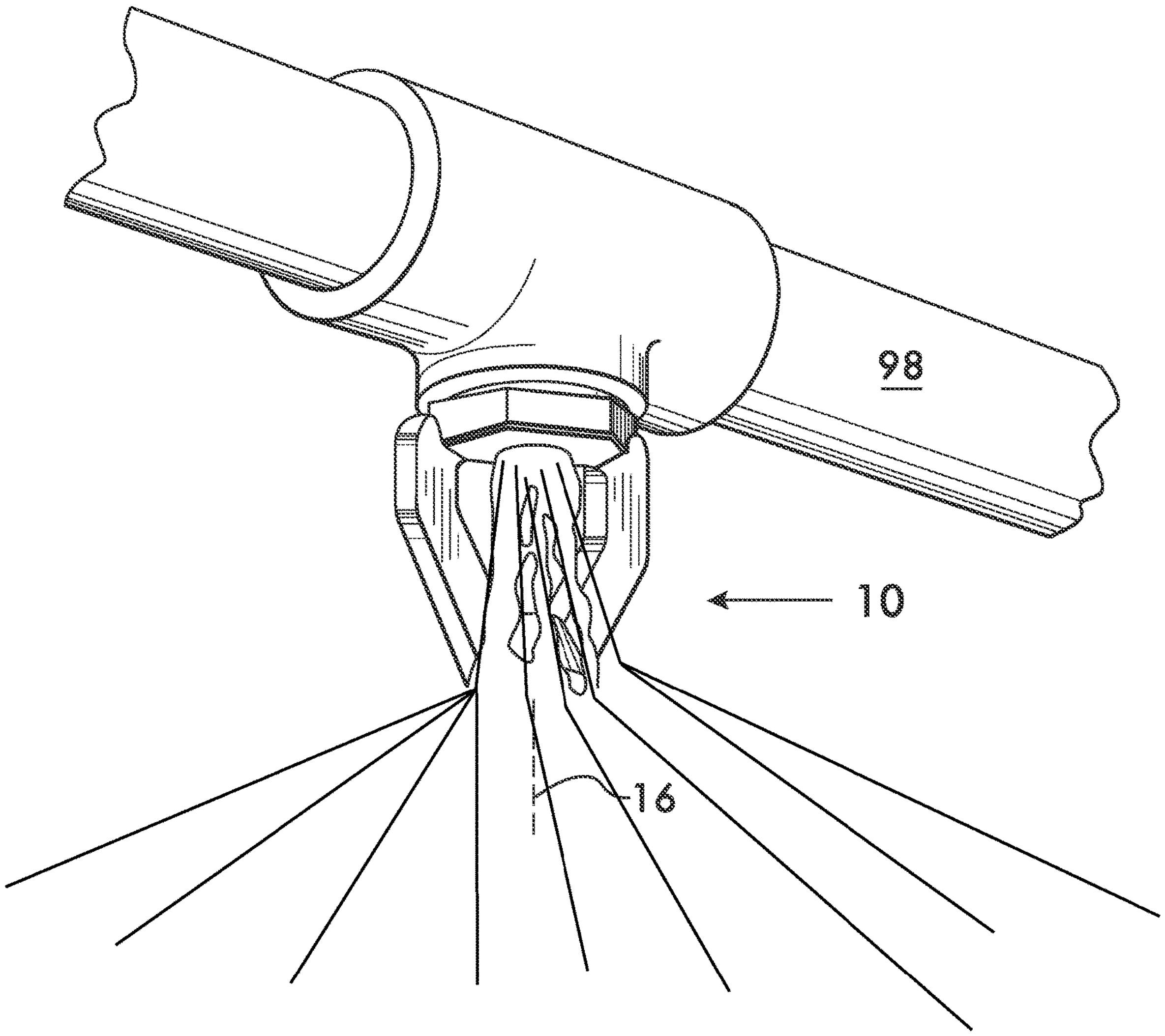
FIG. 1B is an isometric view of an example fire suppression sprinkler shown in a pendent orientation.

The arrangement of slots 62 as shown in FIG. 3 may also be characterized based upon the distance at which the slots terminate from the flow axis 16. In the example embodiment shown, a plurality of first slots, including, for example, slots 64, 68 and 72, and a plurality of second slots, including, for example, slots 66 and 70, extend radially from the periphery 54 toward the flow axis 16. In particular, two of the first slots 64 are disposed in the plane 84 (aligned with the arms 24 and 26) and one of the second slots 66 are positioned adjacent to each side of each of the first slots 64 which are disposed in plane 84. With reference to FIG. 4, it is thought advantageous for the termination distance 88 of second slots 66 from the flow axis 16 be less than the termination distance 86 from the flow axis of the first slots 64. Further advantage is believed possible if the termination distances 88 and 86 from the flow axis 16 are greater than the maximum radius 33 (see FIG. 1) of the nose 28. For a pendent ESFR sprinkler 10 (see FIGS. 1 and 1B) with the arrangement of first and second slots described above, it is desirable that the nose 28 be mounted on ends of the frame arms 24 and 26 at a distance 96 of less than 1.0 inches from the plug 44 as shown in FIG. 1. As shown in FIG. 1A, pendent sprinklers are mounted in a pipeline 98 with the flow axis 16 oriented vertically so that the discharge of fire suppressing fluid is in a downward direction.

The arrangement of slots 62, meaning their angular separation, shape, sizing as well as their orientation and spacing with respect to arms 24 and 26 according to the invention is believed to promote improved performance of fire sprinklers, especially of ESFR sprinklers, by advantageously compensating for the effect known as frame shadowing, whereby arms 24 and 26 represent a discontinuity in the flow of fluid exiting bore 14 to impinge upon deflector 50. In particular, it is believed that the location of slots with the largest surface area or which extend the deepest toward the axis 16 (such as slots 66) adjacent to the slots located above the frame arms (such as slots 64) helps to compensate for frame shadowing. It is further believed that the location of symmetric slots remote from the location of the frame arms (such as slots 70 and 72) where the effect of frame shadowing is at a minimum promotes uniform distribution of fluid where the flow is at its most uniform due to the limited effects of frame shadowing. This arrangement may also be viewed as one where any of slot length, area, and asymmetry is generally reduced from a localized maximum above or adjacent to the frame arms to a localized minimum equidistant from the frame arms, and that such reduction takes place independently on the first and second slots having different termination distances from the flow axis. The advantageous arrangements of the invention, which offer improved compensation for the effects of frame shadowing, result in a more uniform distribution of water discharged from sprinkler 10 is promoted that is believed to result in improved performance.

Fire suppression sprinklers according to the invention are expected to meet or exceed the standards for ESFR sprinklers including by meeting the requirements of UL1767 and resulting in approvals at reduced aisle widths, and better, more uniform performance under all listed conditions.

What is claimed is:

1. A fire suppression sprinkler, said sprinkler comprising:

a body surrounding a bore, said bore defining a flow axis arranged coaxially with said bore;

first and second frame arms mounted on opposite sides of said body and extending therefrom in a direction along said flow axis, said frame arms defining a plane;

a nose mounted on the ends of said frame arms, said nose being positioned coaxially with said flow axis;

a deflector plate mounted on said nose and oriented transversely to said flow axis, said deflector plate having a periphery surrounding a center located on said flow axis, said deflector plate comprising:

two slots of a first configuration extending from said periphery radially toward said center, said two slots of said first configuration being disposed in said plane;

four slots of a second configuration extending from said periphery radially toward said center and being located about said periphery such that one of said slots of said second configuration is positioned adjacent to each side of each of said slots of said first configuration;

four slots of a third configuration extending from said periphery radially toward said center and being located about said periphery such that one of said slots of said third configuration is positioned adjacent to one of said slots of said second configuration; wherein said slots of said second configuration have a greater area than said slots of said first and said third configurations.

2. The fire suppression sprinkler according to claim 1, further comprising four slots of a fourth configuration extending from said periphery radially toward said center and being located about said periphery such that one of said slots of said fourth configuration is positioned adjacent to one of said slots of said third configuration, said slots of said fourth configuration having a greater area than said slots of said third configuration.

3. The fire suppression sprinkler according to claim 1, wherein said bore defines a k factor of k=14.0 or greater and wherein said fire suppression sprinkler is adapted to be installed in a pendent orientation.

4. The fire suppression sprinkler according to claim 1, wherein said slots of said second configuration have a club shape comprising a handle extending from said periphery and a club head terminating at a distance from said center, wherein a width of said club head proximate to said handle is less than a width of said club head proximate to said center.

5. The fire suppression sprinkler according to claim 4, wherein a widest width of said club head is wider than a widest width of said handle.

6. The fire suppression sprinkler according to claim 5, wherein said club head has a curved tip at said distance from said center.

7. The fire suppression sprinkler according to claim 4, wherein said club head is asymmetric with respect to a line extending radially from said center for said slots of said second configuration.

8. The fire suppression sprinkler according to claim 7, wherein said club head is defined by a first edge oriented at a first angle with respect to said line, and a second edge, opposite to said first edge, said second edge oriented at a second angle with respect to said line, said second angle being different from said first angle.

9. The fire suppression sprinkler according to claim 4, wherein each of said slots of said second configuration are symmetric with respect to a line extending radially from said center.

10. The fire suppression sprinkler according to claim 2, wherein said slots of said fourth configuration have a keyhole shape comprising a waist extending from said periphery and a key head terminating at a distance from said center.

11. The fire suppression sprinkler according to claim 10, wherein a widest width of said key head is wider than a widest width of said waist.

12. The fire suppression sprinkler according to claim 10, wherein a width of said key head proximate to said waist is equal to a width of said key head proximate to said center.

13. The fire suppression sprinkler according to claim 10, wherein said key head has a curved tip at said distance from said center.

14. The fire suppression sprinkler according to claim 10, wherein said key head is symmetric with respect to a line extending radially from said center.

15. The fire suppression sprinkler according to claim 1, wherein said slots of said first configuration have an arrowhead shape comprising a shaft extending from said periphery and an arrowhead terminating at a first distance from said center.

16. The fire suppression sprinkler according to claim 15, wherein said arrowhead is asymmetric with respect to a line extending radially from said center.

17. The fire suppression sprinkler according to claim 16, wherein said arrowhead is defined by a first edge oriented at a first angle with respect to said line, and a second edge, opposite to said first edge, said second edge oriented at a second angle with respect to said line, said second angle being different from said first angle.

18. The fire suppression sprinkler according to claim 15, wherein a widest width of said arrowhead is wider than a widest width of said shaft.

19. The fire suppression sprinkler according to claim 15, wherein a width of said arrowhead proximate to said shaft is greater than a width of said arrowhead proximate to said center.

20. The fire suppression sprinkler according to claim 15, wherein said arrowhead has a curved tip at said distance from said center.

21. The fire suppression sprinkler according to claim 15, wherein said shaft has a width at said periphery which is greater than a width of said shaft proximate to said arrowhead.

22. The fire suppression sprinkler according to claim 15, wherein said shaft is defined by first and second oppositely disposed edges, each said edge being angularly oriented with respect to a line extending radially from said center such that said shaft has a width at said periphery which is greater than a width of said shaft proximate to said arrowhead.

23. A fire suppression sprinkler, said sprinkler comprising:

a body surrounding a bore, said bore defining a flow axis arranged coaxially with said bore;

first and second frame arms mounted on opposite sides of said body and extending therefrom in a direction along said flow axis, said frame arms defining a plane;

a nose mounted on the ends of said frame arms, said nose being positioned coaxially with said flow axis;

a deflector plate mounted on said nose and oriented transversely to said flow axis, said deflector plate having a periphery surrounding a center located on said flow axis, said deflector plate comprising:

a plurality of slots of a first configuration extending from said periphery radially toward said center and terminating at a first distance from said center, at least two of said slots of said first configuration being disposed in said plane;

at least four slots of a second configuration extending from said periphery radially toward said center and terminating at a second distance from said center, said slots of said second configuration being located about said periphery such that one of said slots of said second configuration is positioned adjacent to each side of each of said slots of said first configuration which are disposed in said plane;

a plurality of slots of a third configuration extending from said periphery radially toward said center and terminating at a third distance from said center; wherein said second distance is less than said first distance and said third distance.

24. The fire suppression sprinkler according to claim 23, wherein said nose has a maximum radius measured from said flow axis, said first, second, and third distances being greater than said maximum radius.

25. The fire suppression sprinkler according to claim 23, wherein said bore defines a k factor of k=14.0 or greater and wherein said fire suppression sprinkler is adapted to be installed in a pendent orientation.

26. The fire suppression sprinkler according to claim 23, wherein said slots of said second configuration have a club shape comprising a handle extending from said periphery and a club head terminating at said second distance from said center, wherein a width of said club head proximate to said handle is less than a width of said club head proximate to said center.

27. The fire suppression sprinkler according to claim 26, wherein a widest width of said club head is wider than a widest width of said handle.

28. The fire suppression sprinkler according to claim 27, wherein said club head has a curved tip at said distance from said center.

29. The fire suppression sprinkler according to claim 26, wherein said club head is asymmetric with respect to a line extending radially from said center.

30. The fire suppression sprinkler according to claim 29, wherein said club head is defined by a first edge oriented at a first angle with respect to said line, and a second edge, opposite to said first edge, said second edge oriented at a second angle with respect to said line, said second angle being different from said first angle.

31. The fire suppression sprinkler according to claim 26, wherein each of said slots of said second configuration are symmetric with respect to a line extending radially from said center.

32. The fire suppression sprinkler according to claim 23, wherein said slots of said third configuration have a keyhole shape comprising a waist extending from said periphery and a key head terminating at said third distance from said center.

33. The fire suppression sprinkler according to claim 32, wherein a widest width of said key head is wider than a widest width of said waist.

34. The fire suppression sprinkler according to claim 32, wherein a width of said key head proximate to said waist is equal to a width of said key head proximate to said center.

35. The fire suppression sprinkler according to claim 32, wherein said key head has a curved tip at said distance from said center.

36. The fire suppression sprinkler according to claim 32, wherein said key head is symmetric with respect to a line extending radially from said center.

37. The fire suppression sprinkler according to claim 23, wherein said slots of said first configuration have an arrowhead shape comprising a shaft extending from said periphery and an arrowhead terminating at said first distance from said center.

38. The fire suppression sprinkler according to claim 37, wherein said arrowhead is asymmetric with respect to a line extending radially from said center.

39. The fire suppression sprinkler according to claim 37, wherein said arrowhead is defined by a first edge oriented at a first angle with respect to said line, and a second edge, opposite to said first edge, said second edge oriented at a second angle with respect to said line, said second angle being different from said first angle.

40. The fire suppression sprinkler according to claim 37, wherein a widest width of said arrowhead is wider than a widest width of said shaft.

41. The fire suppression sprinkler according to claim 37, wherein a width of said arrowhead proximate to said shaft is greater than a width of said arrowhead proximate to said center.

42. The fire suppression sprinkler according to claim 37, wherein said arrowhead has a curved tip at said distance from said center.

43. The fire suppression sprinkler according to claim 37, wherein said shaft has a width at said periphery which is greater than a width of said shaft proximate to said arrowhead.

44. The fire suppression sprinkler according to claim 37, wherein said shaft is defined by first and second oppositely disposed edges, each said edge being angularly oriented with respect to a line extending radially from said center such that said shaft has a width at said periphery which is greater than a width of said shaft proximate to said arrowhead.

45. An early suppression fast response fire suppression sprinkler, said sprinkler comprising:

a body adapted for use in a pendent orientation, said body surrounding a bore, said bore defining a flow axis arranged coaxially with said bore, said bore defining a k factor of k=25.2 or greater;

first and second frame arms mounted on opposite sides of said body and extending therefrom in a direction along said flow axis, said frame arms defining a plane;

a plug removably mounted on said body between said frame arms and overlying said bore;

a nose mounted on ends of said frame arms at a distance from said plug less than 1.0 inches, said nose being positioned coaxially with said flow axis;

a deflector plate mounted on said nose and oriented transversely to said flow axis, said deflector plate having a periphery surrounding a center located on said flow axis, said deflector plate comprising:

a plurality of first slots extending from said periphery radially toward said center and terminating at a first distance from said flow axis, at least two of said first slots being disposed in said plane;

a plurality of second slots extending from said periphery radially toward said center and terminating at a second distance from said flow axis, said second slots being located about said periphery such that one of said second slots is positioned adjacent to each side of each of said first slots which are disposed in said plane; wherein said second distance is less than said first distance.

46. The fire suppression sprinkler according to claim 45, wherein said nose has a maximum radius measured from said flow axis, said first and second distances being greater than said maximum radius.

47. A fire suppression sprinkler, said sprinkler comprising:

a body surrounding a bore, said bore defining a flow axis arranged coaxially with said bore;

first and second frame arms mounted on opposite sides of said body and extending therefrom in a direction along said flow axis, said frame arms defining a plane;

a nose mounted on the ends of said frame arms, said nose being positioned coaxially with said flow axis;

a deflector plate mounted on said nose and oriented transversely to said flow axis, said deflector plate having a periphery surrounding a center located on said flow axis, said deflector plate comprising:

a plurality of slots of a first configuration extending from said periphery radially toward said center, at least two of said slots of said first configuration being disposed in said plane, at least one of said slots of said first configuration having an arrowhead shape comprising a shaft extending from said periphery and an arrowhead terminating at a first distance from said center, wherein said arrowhead is asymmetric with respect to a first line extending radially from said center;

at least four slots of a second configuration extending from said periphery radially toward said center and being located about said periphery such that one of said slots of said second configuration is positioned adjacent to each side of each of said slots of said first configuration which are disposed in said plane;

a plurality of slots of a third configuration extending from said periphery radially toward said center; wherein said slots of said second configuration have a greater area than said slots of said first configuration and, said slots of said second configuration have a club shape comprising a handle extending from said periphery and a club head terminating at a distance from said center, wherein a width of said club head proximate to said handle is less than a width of said club head proximate to said center, said club head being symmetric with respect to a second line extending radially from said center.

* * * * *